United States Patent [19]

Hernandez-Diaz

[11] Patent Number: 4,884,205

[45] Date of Patent: Nov. 28, 1989

[54] METHOD AND APPARATUS FOR LIMITING ADVERSE YAW-INDUCED ROLL DURING ENGINE FAILURE IN MULTIENGINE AIRCRAFT

[76] Inventor: Jorge H. Hernandez-Diaz, Minillas Sta. Box 41267, Santurce, P.R. 00940

[21] Appl. No.: 83,019

[22] Filed: Aug. 4, 1987

[51] Int. Cl.$^4$ ............................................. G05D 1/00
[52] U.S. Cl. ............................... 364/431.01; 60/702; 244/76 R; 244/194; 73/178 T; 340/965
[58] Field of Search ............................ 364/434, 431.01; 60/702; 340/965–969; 73/178 T; 244/76 R, 76 A, 182, 184, 191, 194, 195

[56] References Cited

U.S. PATENT DOCUMENTS

| | | | |
|---|---|---|---|
| 2,597,020 | 5/1952 | Nissen | 244/76 |
| 2,954,944 | 6/1958 | Huet | 244/76 X |
| 3,160,367 | 12/1962 | LeCarme | 244/76 |
| 4,106,730 | 8/1978 | Spitzer et al. | 244/182 X |
| 4,143,839 | 3/1979 | Antonov et al. | 244/76 R |
| 4,546,353 | 10/1985 | Stockton | 364/431.01 |

OTHER PUBLICATIONS

M. Lacagnina, "The Which Hunter", *AOPA Pilot*, (Aug. 1983): 45, 47.
P. Lert, "The Low Thrust Detector System Can Give the Pilot of a Twin an Extra Margin of Safety", *Air Progress*, (Aug. 1982) (Reprint).
"Feather Guide", *Professional Pilot*, (May 1982): 34.

*Primary Examiner*—Eugene R. LaRoche
*Assistant Examiner*—Benny Lee
*Attorney, Agent, or Firm*—Lowe, Price, LeBlanc, Becker & Shur

[57] ABSTRACT

An apparatus and method for compensating for asymmetrically produced total engine thrust caused by an engine failure in a multiengine aircraft. The presence of asymmetric total thrust is detected by monitoring aircraft performance parameters, including engine manifold pressures, airspeed, roll angle and yaw. When an engine failure resulting in the production of asymmetric thrust is detected at air speeds below a minimum controllable air speed for the aircraft, and during large aircraft bank angles, the power output from an operating engine is reduced to regain and maintain controllable flight conditions. Limiting the adverse yaw produced by an engine failure by reducing power output from operative engines reduces the tendency of the aircraft to roll into the inoperative engine, hence the aircraft is halted.

19 Claims, 4 Drawing Sheets

METHOD AND APPARATUS FOR LIMITING ADVERSE YAW-INDUCED ROLL DURING ENGINE FAILURE IN MULTIENGINE AIRCRAFT

BACKGROUND OF THE INVENTION

The present invention relates generally to aircraft safety devices and, more particularly, to a method and apparatus for automatically limiting adverse yaw and roll caused by asymmetrical thrust due to engine failure in a multiengine aircraft.

In the typical fixed-wing multiengine airplane configuration, where equal net thrust is being generated by engines located along each wing structure, any tendency for "yaw" about the vertical axis of the aircraft is cancelled. However, where one engine produces significantly more thrust than the corresponding engine on the opposite side of the aircraft, several effects take place.

First, the aircraft will tend to yaw in the direction of the engine producing lower thrust because of the greater torque generated about the vertical axis by the engine producing the greater thrust. This effect is compounded in an "engine failure" situation where an inoperative engine produces additional drag while windmilling and until it is feathered.

A second effect of this asymmetrical thrust configuration is to cause the aircraft to roll in the direction of the lower thrust producing or inoperative engine, due in part to the decrease in lift produced by the wing on which it is located. The turning tendency of the aircraft about its vertical axis toward the inoperative engine due to asymmetrical thrust created by the operating engine may be overcome by a counteracting moment produced with the rudder. When the rudder is fully deflected, the corrective turning moment created by the rudder about the aircraft vertical axis is dependent upon the velocity of air flow across the rudder which, in turn, is dependent on the air speed. As the aircraft decelerates, a speed is reached below which the rudder turning moment will no longer be sufficient to balance the thrust moment, and directional control will be lost.

The term $V_{mc}$ is defined as the minimum airspeed at which an airplane is controllable when a critical engine is suddenly made inoperative and the remaining engine is producing takeoff power. The critical engine is defined as the engine which, if it suddenly fails, most adversely affects aircraft performance. $V_{mc}$ thus represents the minimum control speed of an aircraft with a critical engine inoperative.

In a situation where one engine fails with full power applied to an operative engine comparably disposed on the opposite side, as the airspeed drops below $V_{mc}$, directional control is lost and the airplane tends to roll as well as yaw into the inoperative engine. This rolling tendency is aggravated as airspeed is further reduced since the roll must be counteracted by use of aileron control, producing aileron-induced yaw. If a stall should occur in this condition, a violent roll into the inoperative engine may be experienced. Because of the possible disastrous consequences of inducing such a violent roll, airspeed must be maintained above $V_{mc}$ at all times during single-engine operation of a multiengine aircraft. However, if the air speed should fall below $V_{mc}$ for any reason, power must be reduced on the operative engine to regain control of the aircraft. This procedure for regaining control of the aircraft is emphasized in the *Flight Training Handbook*, AC 61-21A (1980) published by the Federal Aviation Administration, Flight Standard Service.

While devices are available to partially compensate for an engine failure by automatically controlling aircraft aerodynamic surfaces, such devices lose effectiveness and can even exacerbate the problem as airspeed falls toward $V_{mc}$. For example, U.S. Pat. No. 4,143,839, to Antonov el al, describes an apparatus which automatically deploys spoilers mounted outboard on the wings to counteract the rolling tendency of an aircraft when one of its propulsion units fails. U.S. Pat. No. 3,160,367, to J.A.M. Lecarme, discloses a system for turbine-powered aircraft, which uses a bleed air system to effect automatic trimming of the rudder under asymmetric power conditions. U.S. Pat. No. 2,954,944, to F. Huet, describes a device to increase aileron effectiveness to control aircraft rolling tendency in an engine failure situation by automatically blowing air along the upper surface of a control surface. Because these devices utilize aircraft control surfaces to compensate for asymmetrical thrust, their effectiveness diminishes with reduced air flow as the airspeed drops toward $V_{mc}$.

A need, therefore, exists for safety apparatus that does not depend upon manipulation of aircraft control surfaces but, instead, directly abates the problem caused by engine failure at low airspeed.

SUMMARY OF THE INVENTION

It is an object of this invention to limit differential thrust and resultant adverse yaw experienced by a multiengine aircraft with one inoperative engine to a level that allows the aircraft aerodynamic control surfaces to maintain directional control.

Another object of the invention is to limit adverse yaw-induced roll during an engine failure to the maximum allowable bank angle for the aircraft.

A further object of the invention is to assist in the recovery of control of an aircraft when engine failure occurs at airspeeds near or below $V_{mc}$.

A still further object of the invention is to permit preflight ground testing of an adverse yaw reduction system to verify operating performance prior to flight.

To achieve these objectives, this invention monitors the aircraft's bank angle, airspeed and engine power outputs and, when the airspeed is determined to be below $V_{mc}$ and the aircraft attitude exceeds a specified bank angle, checks to determine if the total engine power output is symmetrically distributed about the aircraft axis. If thrust is being produced asymmetrically under these low airspeed and large bank angle conditions, a power reduction of the engine producing the higher power output (typically the second engine in a twin-engine aircraft) is commanded. This power reduction can be implemented as a gradual power reduction, a discrete stepwise power reduction, and/or a complete power reduction or shutdown of an operating engine. This has the effect of halting further adverse yaw-induced rolling by the aircraft while enabling the pilot to regain aircraft control.

DESCRIPTION OF THE PREFERRED EMBODIMENT

Figure 1:
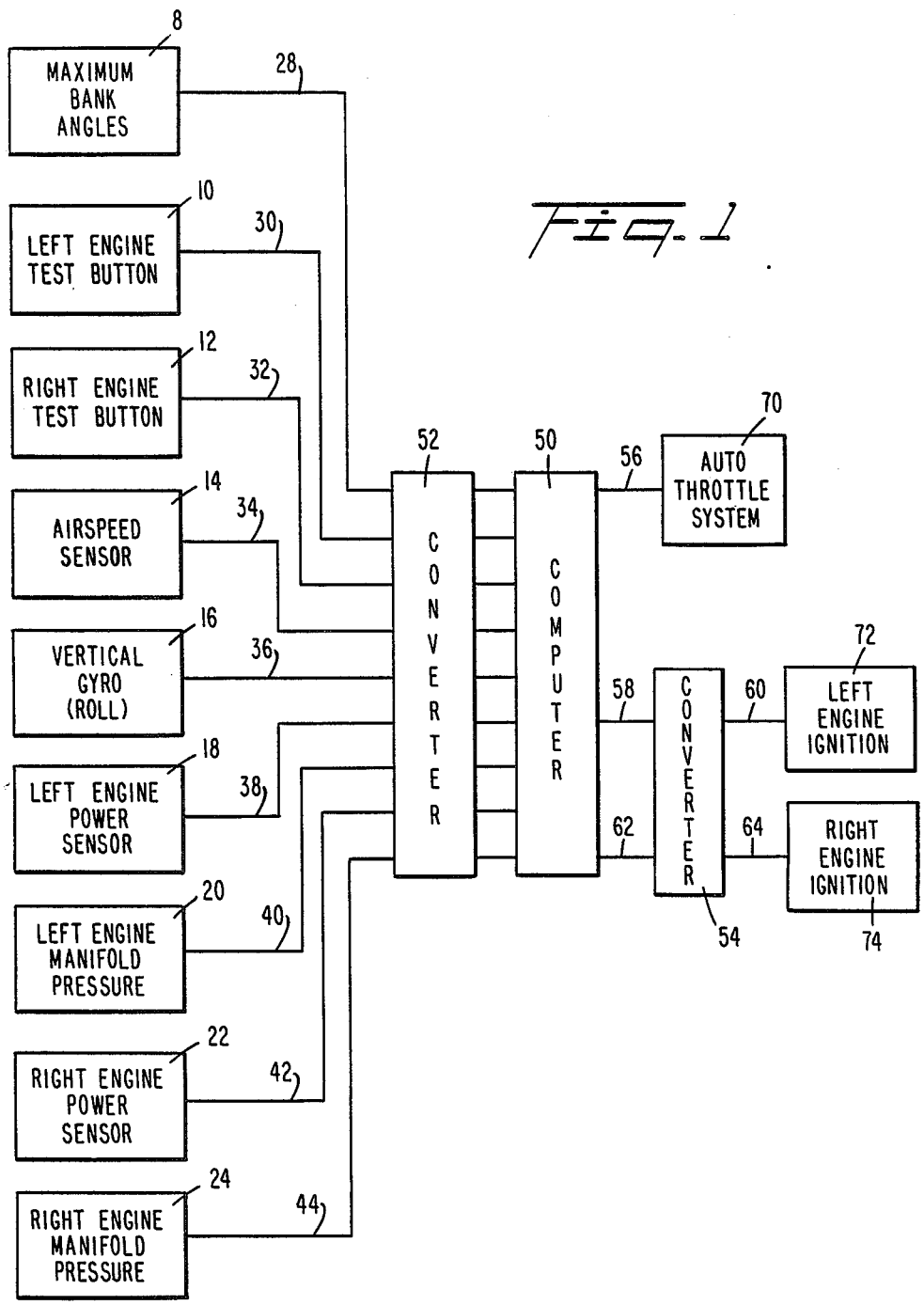
FIG. 1 is a block diagram illustrating a preferred embodiment of the invention in schematic form.

Referring to FIG. 1, values of maximum bank angles are provided via input means 8 to establish roll limits, and are used for comparison with the actual values as measured by vertical gyro 16. Alternatively, the maximum bank angles may be programmed as part of software resident in computer 50. Vertical gyro 16 supplies roll information to computer 50 through converter 52.

Figure 3:
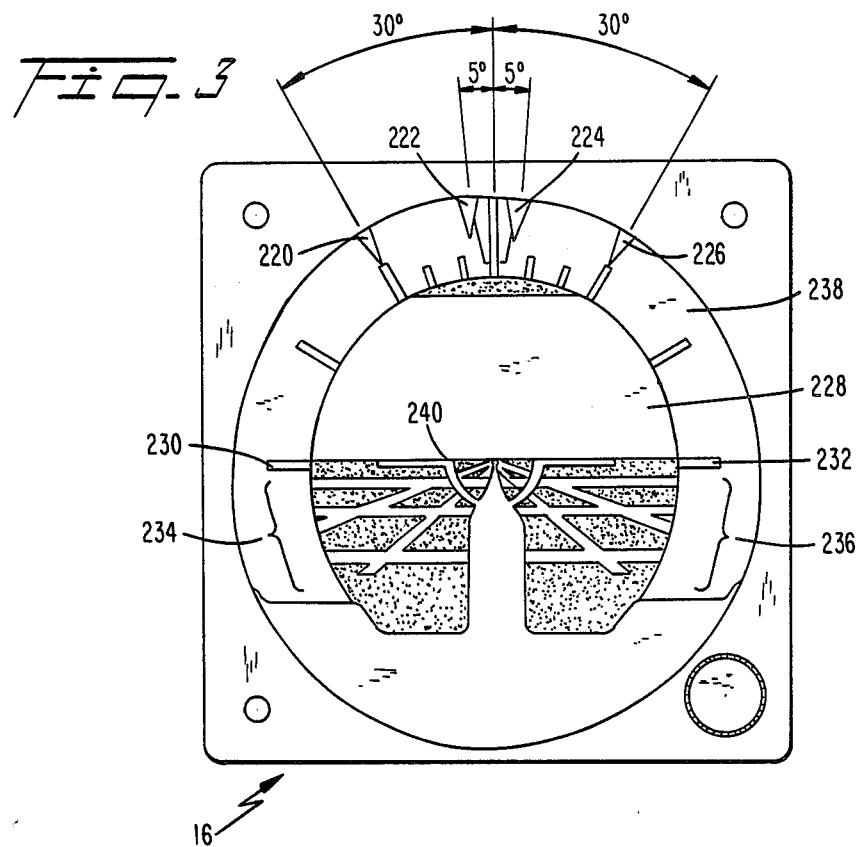
FIG. 3 illustrates an aircraft attitude gyro adapted for use with the apparatus of FIG. 1.

Vertical gyro 16 may comprise a known attitude indicator gyroscope or artificial horizon, with magnetic actuators and corresponding sensors of known and commercially available type placed thereon to be actuated when a specified bank angle is attained or exceeded. FIG. 3 shows such a device 16 having sensors 220, 222, 224 and 226 placed around the periphery of the central gyrostabilized horizon card 228 wherein reference mark 240 represents the bank and pitch attitude of the aircraft. Sensors 220, 222, 224 and 226 are positioned to provide electric signals indicating aircraft bank angles equal to or in excess of 60 degrees and 85 degrees where a zero bank angle represents wings level with the horizon. The sensors can be selected to be magnetically or optically sensitive to lines 232 and 230 and areas 234 and 236 of gyro stabilized rotatable ring 238. Such lines and areas may be specially marked with a material that will generate response in the coacting sensors.

Figure 4:
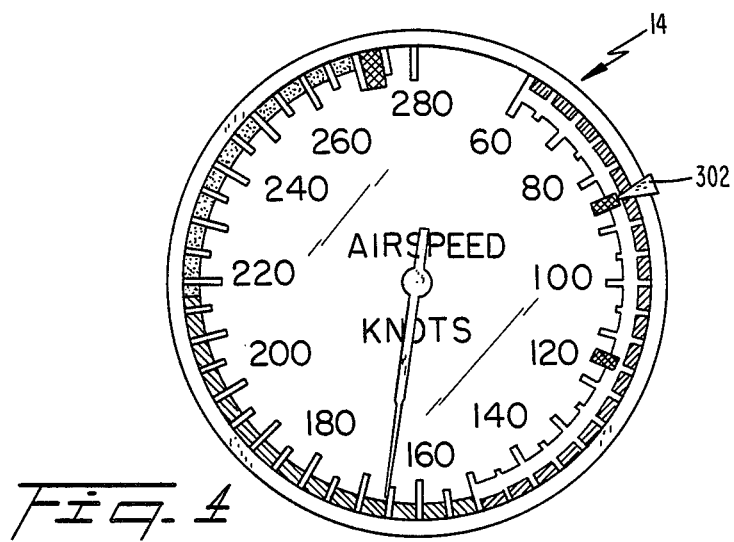
FIG. 4 illustrates an aircraft airspeed indicator adapted for use with the apparatus of FIG. 1.

Airspeed sensor 14 provides an output signal to converter 52 and thus to computer 50 as a function of the dynamic indicated airspeed of the aircraft at all times. FIG. 4 shows such an aircraft airspeed indicator adapted for use with the apparatus of FIG. 1 by the addition of a sensor 302 (comparable to sensor 220, for example) to provide a signal indicating an airspeed of less than $V_{mc}$.

Left engine power sensor 18 and right engine power sensor 22 each provide output signals indicative of an engine pressure ratio (EPR) for turbojets, while in turbo props engine power is expressed in terms of the engine torque produced by the respective associated engine. In aircraft with reciprocating engines, a fuel flow rate may be measured and used to determine the corresponding engine power being produced. Engine power sensors 18 and 22 are used to determine whether an asymmetrical thrust condition exists as would be the case if an engine were to fail. Left engine manifold pressure sensor 20 and right engine manifold pressure sensor 24 provide inputs to the system converter 52 corresponding to the pressure present in the intake manifold of the corresponding engines. This engine manifold pressure, in an operating engine, corresponds to engine power being produced, hence this measurement is readily used in setting engine power levels by means of computer 50 and auto throttle system 70.

Left engine test button 10 and right engine test button 12 provide means for testing the operation of the system by providing test signals simulating failure of the corresponding engine to the computer 50.

Figure 5:
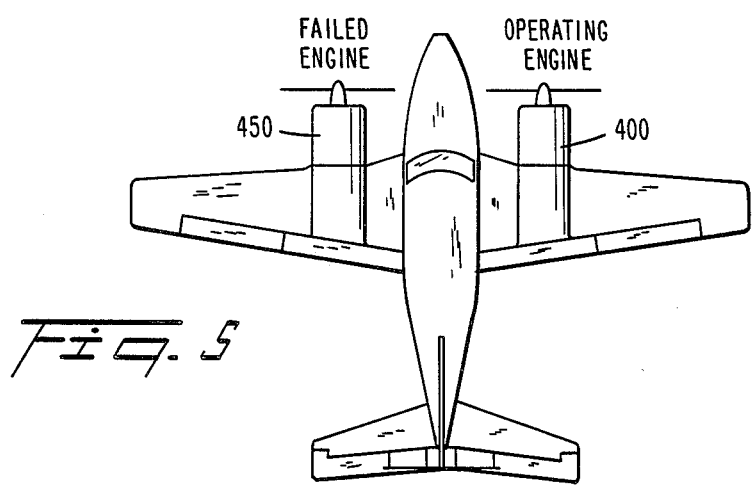
FIG. 5 illustrates an typical multiengine aircraft.
Figure 6:
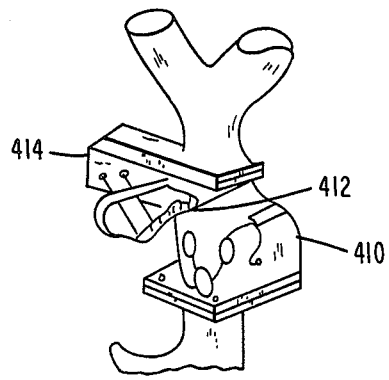
FIG. 6 illustrates an engine power control configuration for use with the apparatus of FIG. 1.

Computer 50 processes input information supplied from input devices 8, 10, 12, 14, 16, 18, 20, 22, 24 via connections 28, 30, 32, 34, 36, 38, 40, 44 and converter 52, by comparing measured values to predetermined reference values, to identify an adverse flight condition as a function of air speed, bank angle, and asymmetrical engine thrust conditions to determine if there is an engine failure requiring a reduction of power from an operating engine. Any desired reduction in engine power from an operating engine is obtained by supplying an appropriate output signal via connection 56 to an auto throttle system 70 of known kind. FIG. 5 illustrates a typical multiengine aircraft or "twin" having left engine 450 and right engine 400 in which the apparatus of the invention is installed. FIG. 6 illustrates an engine power reduction means installed on operating right engine 400, when solenoid 414 receives a signal from computer 50 to control right engine throttle 412 of carburetor 410. This has the effect of reducing the power setting of operating right engine 400 to a predetermined power level. A similar power reduction means is provided as part of left engine 450. If the bank angle exceeds a predetermined second and higher limit, computer 50 commands converter 54 to interrupt either left engine ignition system 72 or right engine ignition system 74 via connections 60 and 64, respectively, as appropriate, to totally shut down an operating engine.

Figure 2:
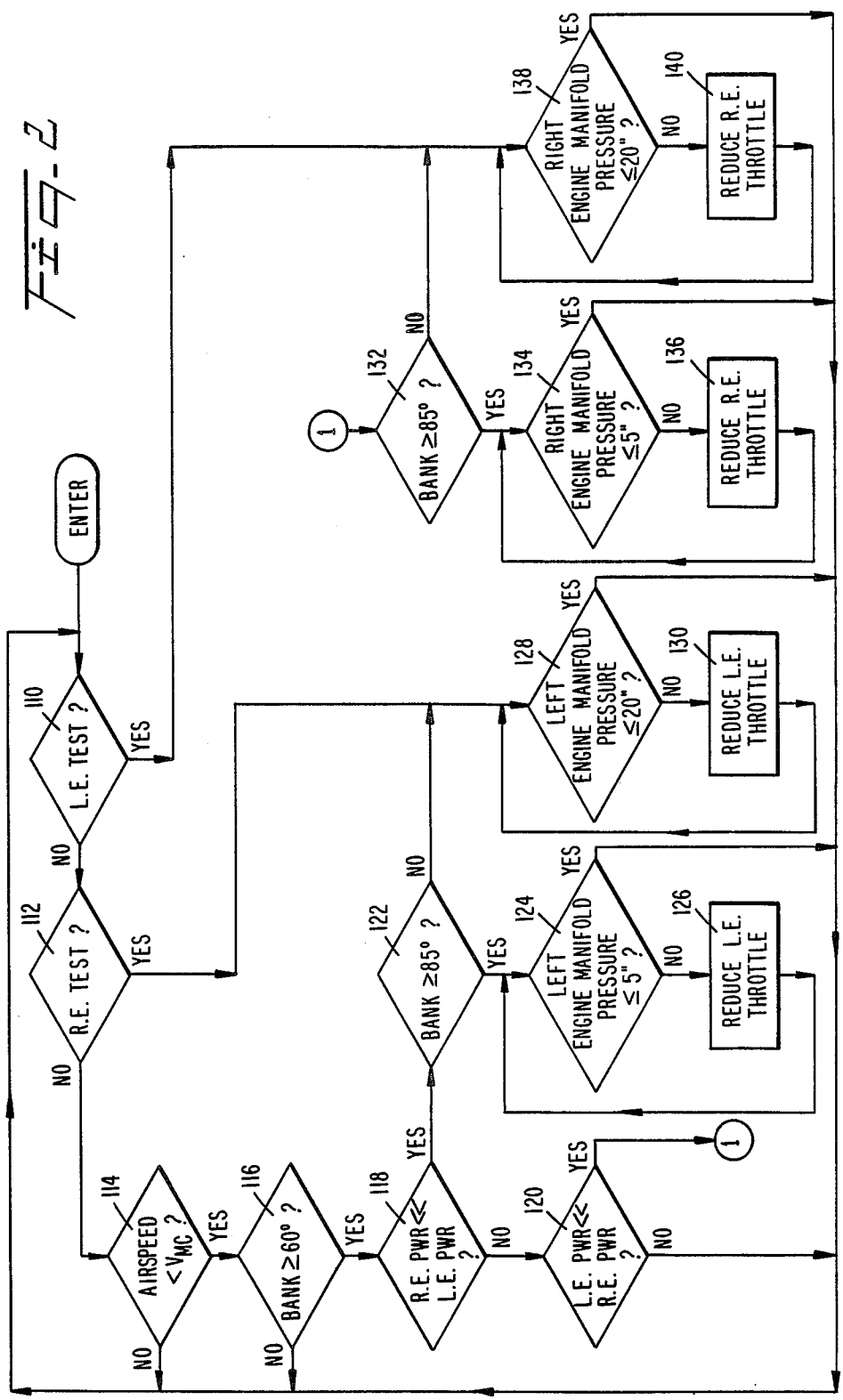
FIG. 2 is a flow chart implementing the required logic as carried out by the computer in the apparatus of FIG. 1.

FIG. 2 is a flow chart showing a processing routine to be implemented by computer 50. Initially, computer 50 tests for an input indicating a simulated failure of either the left engine (block 110) or the right engine (block 112). If such is the case, processing bypasses the airspeed check accomplished by process 114 and bank angle check test 116 and asymmetrical thrust test blocks 118 and 120, these checks and tests being effected as explained more fully herein below. Bypassing these conditional tests allows the system to be exercised as a pre-flight test, with program flow control proceeding to block 128 or block 138, as appropriate, to verify proper functioning of the engine throttle reduction routines.

With the apparatus in its operational mode, airspeed as measured by airspeed sensor 114, is tested in block 114 to determine if it falls below $V_{mc}$. If airspeed is below $V_{mc}$, then program flow proceeds to block 116 where bank angle as measured by vertical gyro 16 is checked to determine if it exceeds, for example, 60 of bank. If the tests of blocks 114 and 116 are passed, respectively indicating a speed below $V_{mc}$ and a bank angle equal to or exceeding 60°, then the processing proceeds to block 118, where a test is performed to determine if left engine power exceeds that of right engine power output by more than a predetermined amount.

If the test of block 118 is passed, indicating that the aircraft has experienced engine failure of the right engine, processing flow proceeds to block 122 to determine if the bank angle is equal to or exceeds, for example, 85°. If the bank angle is less than 85°, but equal to or greater than 60°, then the program flow proceeds to blocks 128 and 130 comprising an engine power reduction loop. The result of this loop is to reduce engine power to less than or equal to a predetermined value corresponding to 20 inches of manifold pressure. If, however, the bank angle is equal to or greater than 85°, indicating a more critical aircraft attitude, then the program flow proceeds to blocks 124 and 126 wherein the left engine throttle setting is adjusted until a corresponding manifold pressure of less than or equal to five inches of mercury is obtained. Conversely, if the test of block 118 is not passed, processing flow proceeds to block 120, wherein a test is performed to determine if right engine power exceeds that of left engine power by more than a predetermined amount. If the test of block 120 is passed, indicating that the aircraft has experienced engine failure of the left engine, equivalent processing is performed for limiting right engine induced adverse yaw to that described above with regard to the left engine. Thus, processing flow proceeds to block 132 to determine if the aircraft bank angle is equal to, or exceeds, 85°. If the bank angle is less than 85°, but equal to or greater than 60°, then program flow proceeds to blocks 138 and 140 comprising a right engine power reduction loop. This loop is analogous to the left engine loop and likewise reduces engine power to less than or equal to a predetermined value corresponding to 20 inches of manifold pressure. If, however, the bank angle is equal to or greater than 85°, indicating a more critical aircraft attitude, then the program flow proceeds to blocks 134 and 136 wherein the right engine throttle setting is adjusted until a corresponding manifold pressure of less than or equal to five inches of mercury is obtained.

It will, of course, be understood that modifications or substitutions of specific components can be made to the specific embodiment described herein without departing from the scope of the invention as defined in the appended claims. By way of example, the angle of attack of the aircraft, as measured by a suitable, "angle of attack indicator", could be substituted for or used in conjunction with the airspeed parameter and use as an input to computer 50. In such a case, referring to FIG. 2, block 114 would correspondingly test for a critical predetermined angle of attack or, alternatively, a parameter based on the airspeed and angle of attack measurements.

Other methods of determining and identifying engine failures are also usable to initiate engine power reduction processing. For example, the "Low Thrust Detector System", by Advanced Aero Systems, monitors engine power using pilot probes mounted near each propeller to detect engine thrust generation. Likewise, engine power reduction may be implemented by intermittently or continuously interrupting the appropriate engine ignition system. Refinements may also be made to the computer algorithm, to provide discrete operating engine power reduction settings responsive to measured aerodynamic and aircraft attitude parameters. Similarly, a user of this invention may readily program the computer to utilize a nearly continuous function based on individual aircraft characteristics or combinations thereof so that engine power is controlled to maintain the aircraft within a safe performance envelope by limiting adverse yaw effects to within predetermined or specified aircraft and pilot capabilities.

What is claimed is:

1. An apparatus for compensating for asymmetrically produced total engine thrust in a multiengine aircraft, comprising:

means for detecting a thrust produced by engines of said multiengine aircraft and producing an asymmetric thrust signal in response to a predetermined asymmetry of said detected thrust;

means for detecting a critical aircraft bank angle greater than a predetermined safe bank angle and producing a signal in response thereto;

means for detecting a low airspeed of said aircraft which is less than a predetermined safe airspeed and producing a signal in response thereto;

means for processing said signals from said asymmetric thrust detecting means, said aircraft bank angle detecting means, and said airspeed detecting means for producing a signal to control the power of an operating engine to reduce said asymmetry of total thrust; and engine power control means to control the power of said operating engine responsive to said power control signal.

2. An apparatus for limiting adverse yaw caused by asymmetrically produced total thrust in a multiengine aircraft, comprising:

asymmetrical thrust detector means including engine power measurement means for measuring engine power outputs from each engine and for generating signals indicative of the corresponding thrust developed thereby;

aircraft attitude detector means for detecting aircraft attitude and producing a signal responsive thereto; and control means responsive to said signals from said asymmetric thrust detector means and said aircraft attitude detector means for controlling said aircraft engine outputs to reduce said asymmetry of total thrust.

3. An apparatus as defined in claim 2, wherein said engine power measurement means comprises means for measuring engine torque outputs from each engine and for generating signals indicative of the corresponding thrust developed thereby.

4. An apparatus as defined in claim 2, wherein said engine power measurement means comprises means for measuring engine fuel flow rate outputs from each engine and for generating signals indicative of the corresponding thrust developed thereby.

5. An apparatus as defined in claim 2, wherein said engine power measurement means comprises means for measuring engine intake manifold pressure outputs from each engine and for generating signals indicative of the corresponding thrust developed thereby.

6. An apparatus as defined in claim 2, wherein said multiengine aircraft includes a plurality of turbine type engines and said power measurement means comprises turbine engine pressure ratio measurement means for measuring engine power outputs from each of said turbine engines.

7. An apparatus as defined in claim 2, wherein said aircraft attitude detector means comprises aircraft bank angle indicator means.

8. An apparatus as defined in claim 2, wherein said aircraft attitude detector means comprises angle-of-attack detector means.

9. An apparatus as defined in claim 2, further comprising:

airspeed measurement means for producing a signal related thereto and wherein said control means is additionally responsive to said airspeed measurement signal.

10. An apparatus as defined in claim 9, wherein said control means comprises a microprocessor for receiving (a) said engine thrust signals from said engine power measurement means of said asymmetric thrust detector means, (b) aircraft attitude signals from said aircraft attitude detector means and (c) airspeed measurement signals from said airspeed measurement means and, in response to said received signals, detecting a predetermined critical aircraft attitude, airspeed, and asymmetry of thrust condition for controlling said aircraft engine outputs to reduce said asymmetry of total thrust.

11. An apparatus as defined in claim 9, wherein said control means comprises engine ignition interruption means.

12. An apparatus as defined in claim 9, wherein said aircraft attitude detector means comprises aircraft bank angle indicator means.

13. An apparatus for compensating for asymmetrically produced thrust in a multiengine aircraft, comprising:
    engine failure identification means for detecting a thrust produced by engines of said multiengine aircraft and, responsive thereto, providing a low thrust signal indicative of a low engine output power;
    aircraft bank angle measurement means for providing a bank angle signal indicative of a bank angle equal to or greater than a reference bank angle;
    aircraft air speed measurement means for measuring an airspeed of said multiengine aircraft and providing a low airspeed signal responsive to a measured airspeed less than a reference airspeed; and
    engine power control means responsive to said low thrust signal, said bank angle signal and said low airspeed signal for controlling a power output of an operative one of said engines of said multiengine aircraft.

14. An apparatus as defined in claim 13, wherein said engine power control means is operatively responsive to a measured airspeed less than a predetermined minimum controllable airspeed for said multiengine aircraft.

15. A method for compensating for asymmetrically produced total engine thrust in a multiengine aircraft having a plurality of thrust producing engines, comprising the steps of:
    identifying a failed engine of said plurality of engines of said multiengine aircraft;
    detecting a low airspeed of said multiengine aircraft which is less than a predetermined safe airspeed;
    detecting a critical aircraft bank angle greater than a predetermined safe bank angle; and
    in response to said steps of (a) identifying a failed engine, (b) detecting said low airspeed and (c) detecting said critical bank angle, reducing an engine power of an operating engine of said plurality of engines to reduce said lack of symmetry of total engine thrust.

16. A method for compensating for asymmetrically produced total engine thrust in a multiengine aircraft having a plurality of thrust producing engines, comprising the steps of:
    detecting a predetermined asymmetry of total engine thrust of said plurality of thrust producing engines;
    detecting a low airspeed of said multiengine aircraft which is less than a predetermined minimum safe airspeed; and
    in response to said detected asymmetry of total engine thrust and detecting said low airspeed, controlling an engine thrust to reduce said lack of symmetry of total engine thrust.

17. A method as defined in claim 16, further comprising the step of detecting a critical bank angle of said multiengine aircraft greater than a predetermined safe bank angle, wherein said engine thrust controlling step is additionally responsive to said detection of said critical bank angle to control and engine thrust to reduce said lack of symmetry of total engine thrust.

18. A method as defined in claim 17, further comprising the step of detecting an airspeed below a predetermined air speed.

19. A method as defined in claim 18, wherein said predetermined air speed is defined as the minimum controllable air speed for the aircraft.

* * * * *